(12) United States Patent
Seok

(10) Patent No.: US 10,342,045 B2
(45) Date of Patent: Jul. 2, 2019

(54) METHOD AND APPARATUS FOR TRANSMITTING DOWNLINK IN WIRELESS COMMUNICATION SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/765,127

(22) PCT Filed: Feb. 5, 2014

(86) PCT No.: PCT/KR2014/000994
§ 371 (c)(1),
(2) Date: Jul. 31, 2015

(87) PCT Pub. No.: WO2014/123357
PCT Pub. Date: Aug. 14, 2014

(65) Prior Publication Data
US 2015/0365972 A1    Dec. 17, 2015

Related U.S. Application Data

(60) Provisional application No. 61/761,157, filed on Feb. 5, 2013.

(51) Int. Cl.
*H04W 74/08* (2009.01)
*H04W 84/12* (2009.01)
*H04B 7/0452* (2017.01)

(52) U.S. Cl.
CPC ...... *H04W 74/0816* (2013.01); *H04B 7/0452* (2013.01); *H04W 74/0891* (2013.01); *H04W 84/12* (2013.01)

(58) Field of Classification Search
CPC ............. H04W 84/12; H04W 74/0816; H04W 72/0453; H04W 74/006; H04B 7/0452; H04L 5/0007; H04L 5/0023
See application file for complete search history.

(56) References Cited

U.S. PATENT DOCUMENTS

2011/0122933 A1    5/2011   Adam et al.
2012/0020312 A1    1/2012   Lv et al.
(Continued)

FOREIGN PATENT DOCUMENTS

| KR | 10-2006-0117190 | 11/2006 |
| KR | 10-2007-0021899 | 2/2007 |
| KR | 10-2010-0084465 | 7/2010 |

OTHER PUBLICATIONS

PCT International Application No. PCT/KR2014/000994, Written Opinion of the International Searching Authority dated Apr. 30, 2014, 1 page.

*Primary Examiner* — Jung H Park
(74) *Attorney, Agent, or Firm* — Lee Hong Degerman Kang Waimey

(57) ABSTRACT

Disclosed are a method and an apparatus for transmitting a downlink in a wireless communication system. A method for transmitting the downlink in a WLAN comprises the steps of: an access point (AP) transmitting, to a plurality of stations (STA), each of a plurality of request to send (RTS) frames through each of a plurality of channels; and the AP receiving a clear to send (CTS) frame from at least one of the plurality of STAs through at least one channel from the plurality of channels, wherein each of the plurality of RTS frames may include channel information for indicating a channel to be used from among the plurality of channels when transmitting the downlink to each of the STAs, and identifier information for indicating the plurality of STAs.

10 Claims, 16 Drawing Sheets

(56) References Cited

U.S. PATENT DOCUMENTS

| | | | |
|---|---|---|---|
| 2012/0082040 A1* | 4/2012 | Gong | H04W 74/0816 |
| | | | 370/252 |
| 2012/0087358 A1* | 4/2012 | Zhu | H04W 72/042 |
| | | | 370/338 |
| 2012/0218983 A1* | 8/2012 | Noh | H04B 7/0452 |
| | | | 370/338 |
| 2012/0327870 A1* | 12/2012 | Grandhi | H04W 28/06 |
| | | | 370/329 |
| 2013/0286959 A1* | 10/2013 | Lou | H04W 72/04 |
| | | | 370/329 |
| 2017/0155490 A1* | 6/2017 | Wang | H04L 5/0055 |

\* cited by examiner

FIG. 1
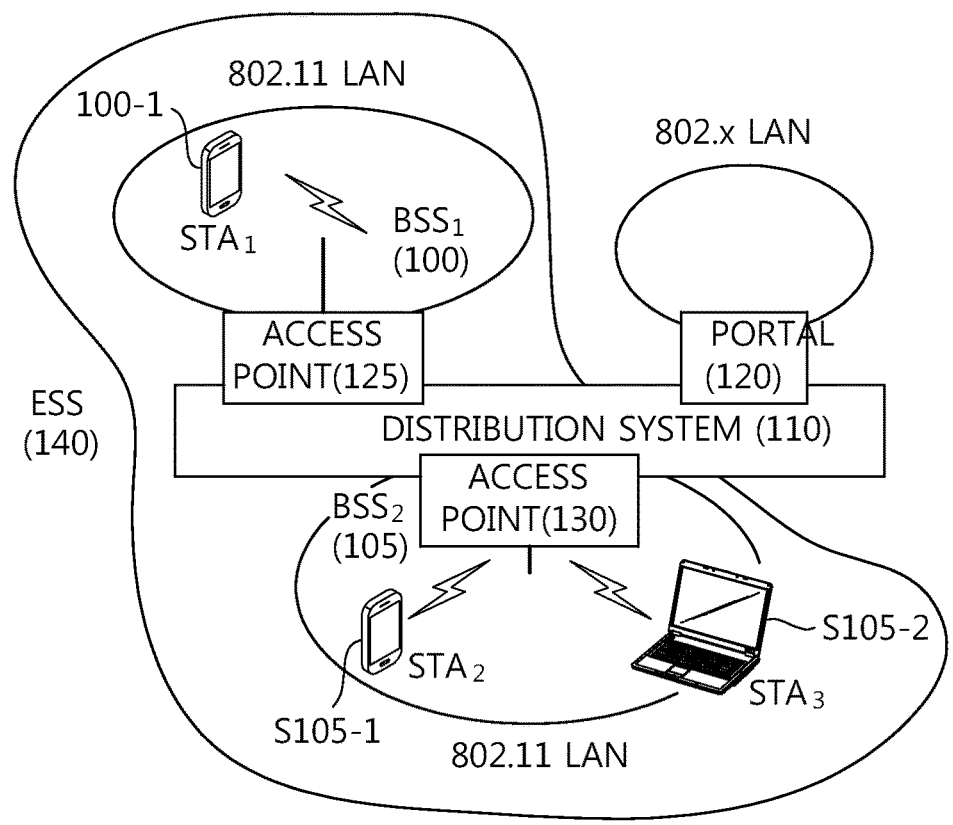
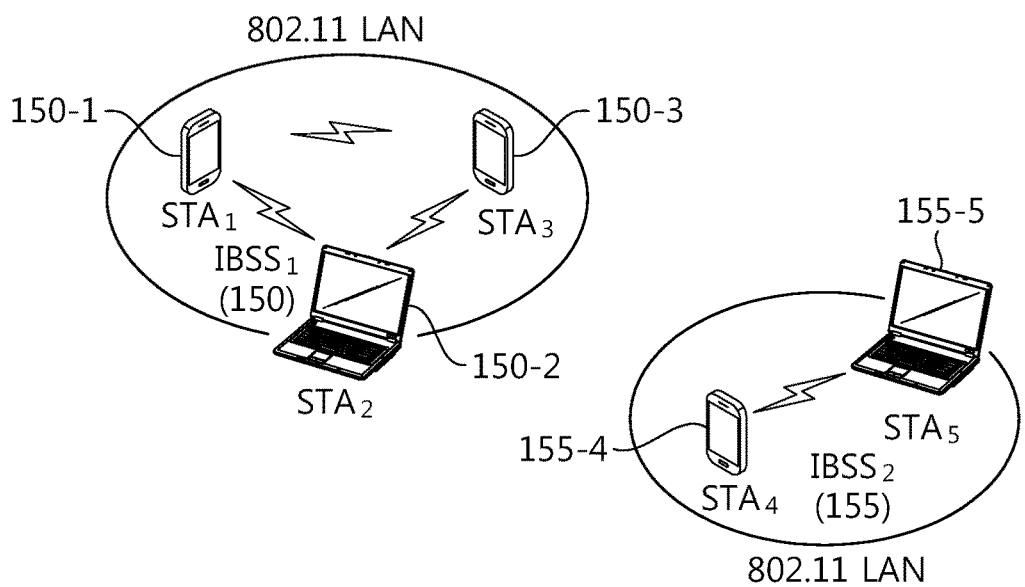

FIG. 3
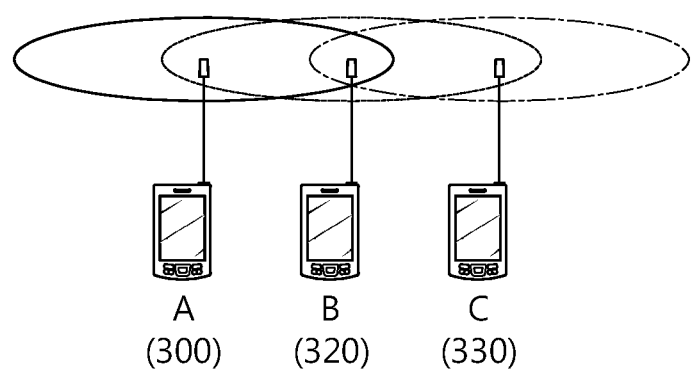
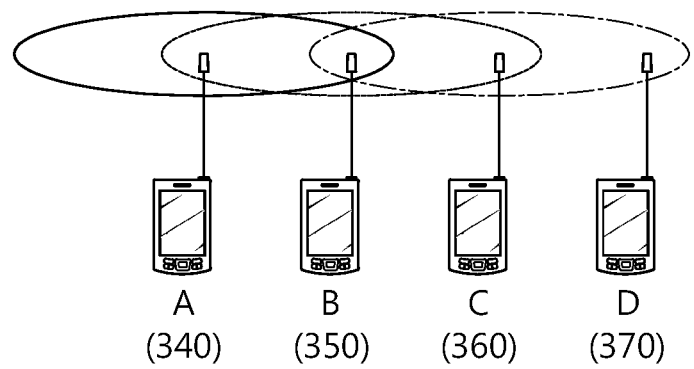

FIG. 4
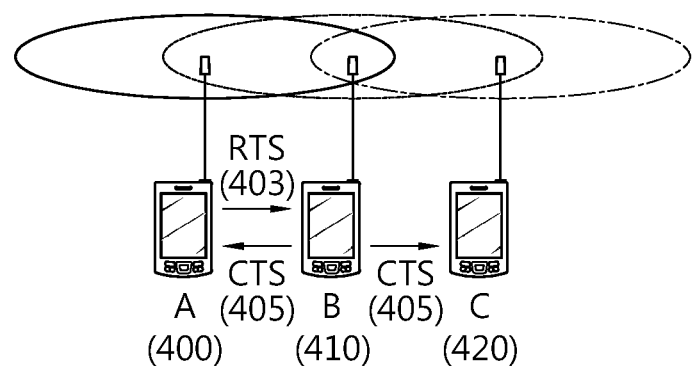
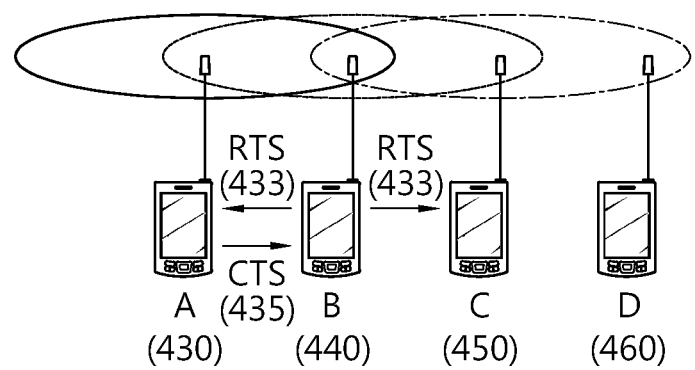

FIG. 12

FIRST DATA FRAME (1210): | STF | LTF1 | SIG | Data 1 | Data 2 | Data 3 | Data 4 | ...
Indicates (SGI): SGI SGI SGI SGI SECOND DATA FRAME (1220): | STF | LTF1 | SIG | Data 1 | Data 2 | Data 3 | Data 4 | ...
Indicates (SGI): SGI SGI SGI SGI FIRST DATA FRAME (1250): | STF | LTF1 | SIG | Data 1 | Data 2 | Data 3 | Data 4 | ...
Indicates (LGI): LGI LGI LGI LGI SECOND DATA FRAME (1260): | STF | LTF1 | SIG | Data 1 | Data 2 | Data 3 | Data 4 | ...
Indicates (LGI): LGI LGI LGI LGI

FIG. 15
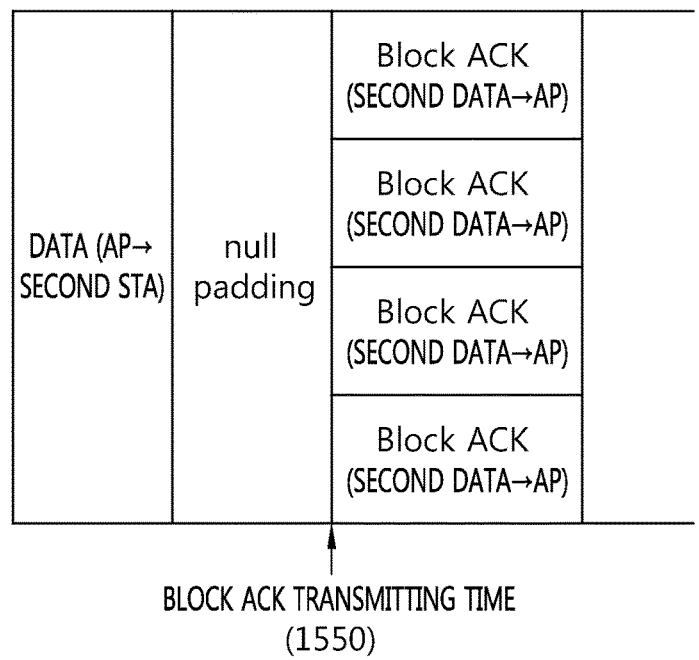
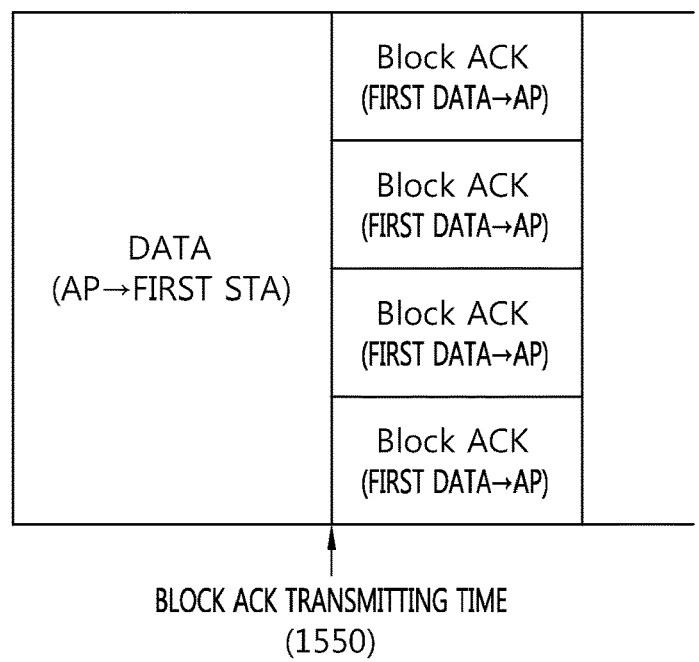
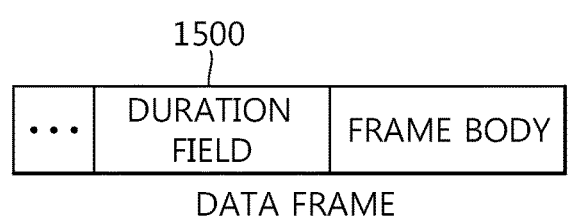

METHOD AND APPARATUS FOR TRANSMITTING DOWNLINK IN WIRELESS COMMUNICATION SYSTEM

CROSS-REFERENCE TO RELATED APPLICATIONS

This application is the National Stage filing under 35 U.S.C. 371 of International Application No. PCT/KR2014/000994, filed on Feb. 5, 2014, which claims the benefit of U.S. Provisional Application No. 61/761,157, filed on Feb. 5, 2013, the contents of which are all hereby incorporated by reference herein in their entirety.

BACKGROUND OF THE INVENTION

Field of the Invention

The present invention relates to wireless communication, and more particularly, to a method and an apparatus for transmitting a downlink in a wireless local area network (WLAN).

Related Art

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of a high efficiency WLAN (HEW) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the HEW operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the HEW, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the HEW, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

SUMMARY OF THE INVENTION

The present invention provides a method for transmitting a downlink in a wireless communication system.

The present invention also provides an apparatus for transmitting a downlink in a wireless communication system.

In an aspect, a method for transmitting a downlink in a wireless communication system is provided. A method for transmitting a downlink in a wireless local area network (WLAN) comprises: transmitting, by an access point (AP), multiple respective request to send (RTS) frames to multiple stations (STAs) through multiple respective channels; and receiving, by the AP, a clear to send (CTS) frame from at least one of the multiple STAs through at least one channel of the multiple channels, wherein each of the multiple RTS frames includes channel information indicating a channel to be used when performing the downlink transmission to the multiple respective STAs among the multiple channels and identifier information indicating the multiple STAs.

In another aspect, An access point (AP) transmitting a downlink in a wireless local area network (WLAN) comprises a radio frequency (RF) unit configured to transmit and receive a radio signal and a processor configured to: transmit each of a plurality of request to send (RTS) frames to each of a plurality of stations (STAs) through each of a plurality of channels; and receive a clear to send (CTS) frame from at least one of the plurality of STAs through at least one channel of the plurality of channels, wherein each of the plurality of RTS frames includes channel information indicating a channel to be used when performing the downlink transmission to the plurality of STAs among the plurality of channels and identifier information indicating the plurality of STAs.

Data transmitting and receiving methods based on FDMA can be used between an extended AP supporting the existing legacy channel band and a newly defined extended channel band and a legacy STA supporting the existing legacy channel band and an extended STA supporting the existing legacy channel band and a newly defined extended channel band. Accordingly, a data throughput and frequency efficiency can be increased by using the newly extended channel band.

BRIEF DESCRIPTION OF THE DRAWINGS

FIG. 1 is a conceptual diagram illustrating a structure of a wireless local area network (WLAN).

FIG. 3 is a conceptual diagram illustrating an issue which may occur when the STA senses a medium.

FIG. 4 is a conceptual diagram illustrating a method for transmitting and receiving an RTS frame and a CTS frame in order to solve a hidden node issue and an exposed node issue.

FIG. 12 is a conceptual diagram illustrating a method for transmitting a data frame according to the embodiment of the present invention.

FIG. 15 is a conceptual diagram illustrating a method for configuring a frame transmission time in the downlink transmitting method based on the FDMA according to the embodiment of the present invention.

DESCRIPTION OF EXEMPLARY EMBODIMENTS

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
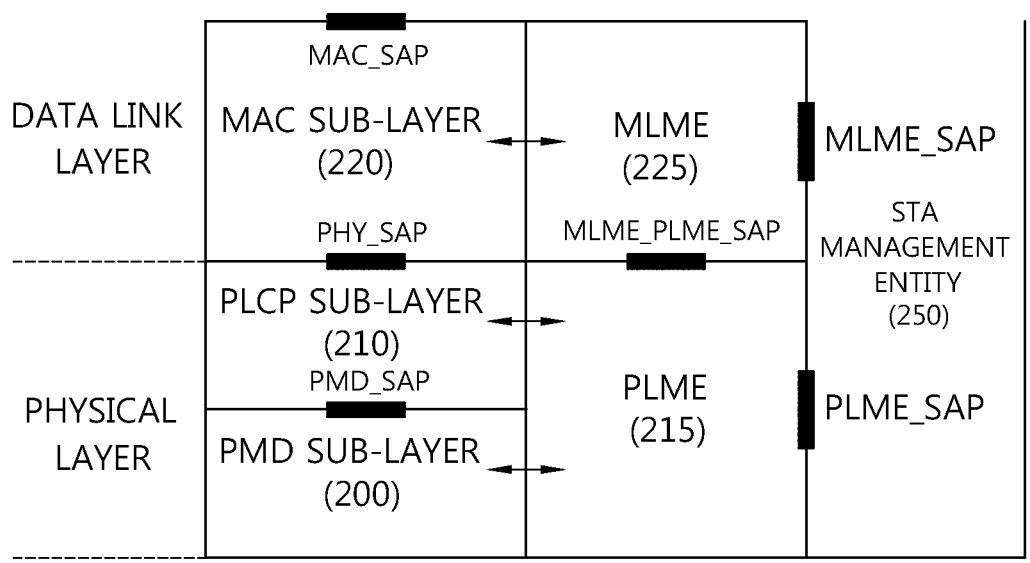
FIG. 2 is a diagram illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

FIG. 3 is a conceptual diagram illustrating an issue which may occur when the STA senses a medium.

An upper end of FIG. 3 illustrates a hidden node issue and a FIG. 3(B) illustrates an exposed node issue.

At the upper end of FIG. 3, it is assumed that an STA A 300 and an STA B 320 transmit and receive current data and an STA C 330 and an STA B 320 has data to be transmitted. When the data is transmitted and received between the STA A 300 and the STA B 320, a specific channel may be busy. However, when the STA C 330 carrier-senses a medium before transmitting the data to the STA B 320 due to transmission coverage, the STA C 330 may determine that the medium for transmitting the data to the STA B 320 is in an idle state. When the STA C 330 determines that the medium is in the idle state, the data may be transmitted from the STA C 330 to the STA B 320. Consequently, since the STA B 320 simultaneously receives information of the STA A 300 and the STA C 330, a collision of data occurs. In this case, the STA A 300 may be a hidden node as the STA C 330.

At a lower end of FIG. 3, it is assumed that an STA B 350 transmits data to an STA A 340. When an STA C 360 intends to transmit data to an STA D 370, the STA C 360 may perform carrier sensing in order to find whether the channel is busy. The STA C 360 may sense that the medium is busy due to transmission coverage of the STA B 350 because the STA B 350 transmits information to the STA A 340. In this case, although the STA C 360 intends to transmit data to the STA D 370, since it is sensed that the medium is busy, the STA C 360 may not transmit the data to the STA D 370. Until it is sensed that the medium is idle after the STA B 350 completes transmitting the data to the STA A 340, a situation in which the STA C 360 needs to unnecessarily wait occurs. That is, although the STA A 340 is out of a carrier sensing range of the STA C 360, the STA A 340 may prevent data transmission by the STA C 360. In this case, the STA C 360 becomes an exposed node of the STA B 350.

In order to solve the hidden nose issue disclosed at the upper end of FIG. 3 and the exposed node issue disclosed at the lower end of FIG. 3, it may be sensed whether the medium is busy by using an RTS frame and a CTS frame in a WLAN.

FIG. 4 is a conceptual diagram illustrating a method for transmitting and receiving the RTS frame and the CTS frame in order to solve the hidden node issue and the exposed node issue.

Referring to FIG. 4, short signaling frames such as the request to send (RTS) frame and the clear to send (CTS) frame may be used in order to solve the hidden node issue and the exposed node issue. It may be overheard whether data is transmitted and received among neighboring STAs based on the RTS frame and the CTS frame.

An upper end of FIG. 4 illustrates a method for transmitting an RTS frame 403 and a CTS frame 405 in order to solve the hidden node issue.

Assumed that both an STA A 400 and an STA C 420 intend to transmit data to an STA B 410, when the STA A 400 sends the RTS frame 403 to the STA B 410, the STA B 410 may transmit the CTS frame 405 to both the STA A 400 and the STA C 420 therearound. The STA C 420 that receives the CTS frame 405 from the STA B 410 may obtain information indicating that the STA A 400 and the STA B 410 are transmitting data. Further, the RTS frame 403 and the CTS frame 405 include a duration field including information on a busy duration of a radio channel to configure a network allocation vector (NAV) during a predetermined duration so as to prevent the STA C 420 from using the channel.

The STA C 420 waits until the transmission and reception of the data between the STA A 400 and the STA B 410 is completed, and as a result, the STA C 420 may avoid the collision at the time of transmitting the data to the STA B 410.

A lower end of FIG. 4 illustrates a method for transmitting an RTS frame 433 and a CTS frame 435 in order to solve the exposed node issue.

An STA C 450 overhears transmission of the RTS frame 433 and the CTS frame 435 of an STA A 430 and an STA B 440, and as a result, the STA C 450 may find that no collision occurs in spite of transmitting the data to another STA D 460. That is, the STA B 440 transmits the RTS frame 433 to all neighboring terminals and transmits the CTS frame 435 to only the STA A 430 to which the STA B 440 needs to actually transmit data. Since the STA C 450 receives only the RTS frame 433 and may not receive the CTS frame 435 of the STA A 430, it may be found that the STA A 430 is out of a carrier sensing range of the STA C 450. Accordingly, the STA C 450 may not transmit data to the STA D 460.

An RTS frame format and a CTS frame format are disclosed in 8.3.1.2 RTS frame format and 8.3.1.3 CTS frame format of "IEEE Standard for Information Technology Telecommunications and information exchange between systems Local and metropolitan area networks Specific requirements Part 11: Wireless LAN Medium Access Control (MAC) and Physical Layer (PHY) Specifications which is IEEE Draft P802.11-REVmb™/D12 opened in November 2011.

The IEEE 802.11 WLAN (wireless local area network, WLAN) standard may have different transmission rate in various bands. A very high throughput (VHT) system which is the IEEE 802.11ac standard is to provide a throughput of 1 Gbps or more at a MAC service access point (SAP).

To this end, the VHT system may support a channel bandwidth of 80/160 MHz and 8 spatial streams. When the channel bandwidth of 160 MHz, 8 spatial streams, 256QAM, and a short guard interval (GI) are all implemented, the VHT system may provide a maximum of 6.9 Gbps transmission rate.

However, VHT STAs that support multiple VHT systems need to simultaneously use the channel in order for an aggregated throughput of a VHT BSS to satisfy 1 Gbps in an actual environment.

An AP that supports a VHT may use space division multiple access (SDMA) or multi user-multiple input multiple output (MU-MIMO) as a method for transmitting data in order for the STAs supporting the multiple VHT systems to simultaneously use the channel. That is, the VHT systems may simultaneously transmit and receive different data among the multiple VHT STAs and the VHT AP based on multiple spatial streams.

In the VHT system, since legacy stations (STAs) supporting IEEE 802.11a/n are widely used in transmitting data by using the channel bandwidth of 160 MHz.

Accordingly, non-contiguous channels need to be aggregated and used.

Figure 5:
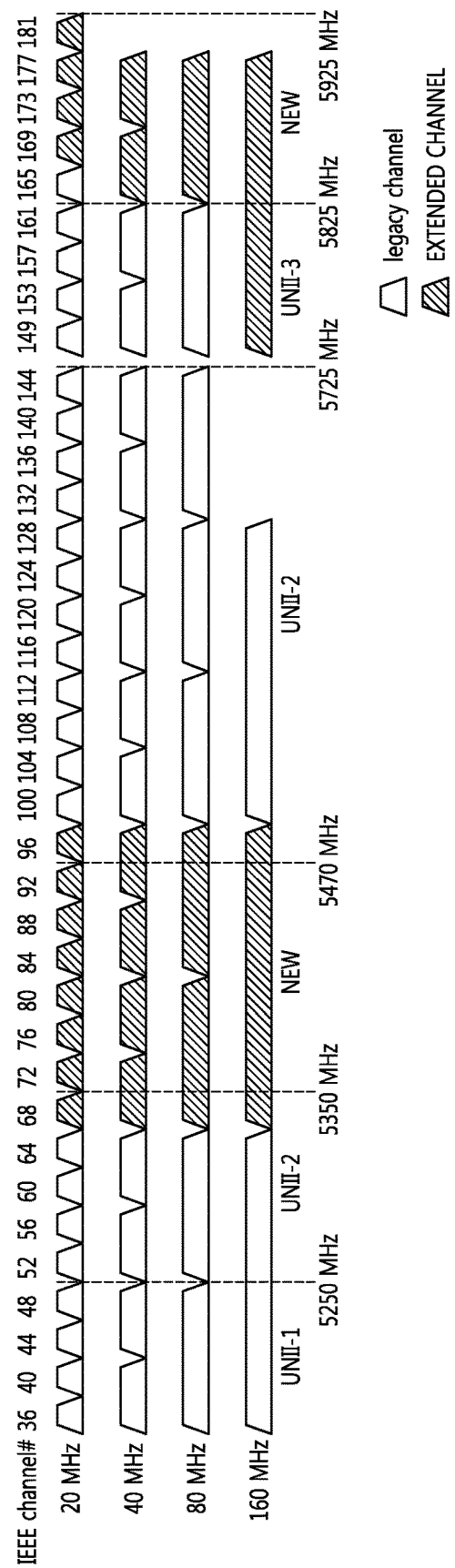
FIG. 5 is a conceptual diagram illustrating information on a bandwidth of the WLAN.

FIG. 5 is a conceptual diagram illustrating information on the bandwidth of the WLAN.

With the increase in demand for high-definition multimedia transmission, a channel bandwidth for the WLAN has been extended.

Referring to FIG. 5, channel bands which the IEEE 802.11ac may currently use and bands to be newly added in a frequency band of 5 GHz are illustrated.

When channel bands to be newly allocated for the WLAN in channel bands of 5350 MHz to 5470 MHz and 5825 MHz to 5925 MHz are considered, the number of channel bands which may be used by the STA or AP may increase. For example, referring to the 80 MHz channel band, 80 MHz channel bands which are usable may increase from 6 channels at present to 9 channels by allocating the new channel bands. As another example, referring to the 160 MHz channel band, 160 MHz channel bands which are usable may increase from 2 channels at present to 4 channels.

The legacy STA (e.g., the STA supporting the IEEE 802.11a/n/ac) in the related art, which operates at 5 GHz does not support the newly allocated channels. Accordingly, the AP that supports the newly allocated channels configures a primary channel as a channel in which the legacy STA may operate to support the legacy STA.

Hereinafter, in the embodiment of the present invention, the channel bands allocated to 5 GHz are defined and disclosed as two types of channel bands. The existing channel supported by the legacy STA such as the IEEE 802.11a/n/ac is defined as a term called a legacy channel band the newly allocated channel band at 5 GHz is defined as an extended channel band. Further, an STA that may operate in the extended channel band is used as a term such as an extended STA.

Hereinafter, in the embodiment of the present invention, a method will be disclosed, in which the AP performs downlink channel transmission to the legacy STA and the extended STA by using the legacy channel band in the 5 GHz frequency band and the extended channel band. The AP may perform downlink transmission based on frequency division multiple access (FDMA). A legacy channel and an extended channel may be the non-contiguous channel or a contiguous channel.

The embodiment of the present invention may be applied to the FDMA based downlink transmission when all channels are the legacy channels and the FDMA based downlink transmission when all channels are the extended channels in addition to the FDMA based downlink transmission through the legacy channel and the extended channel.

Figure 6:
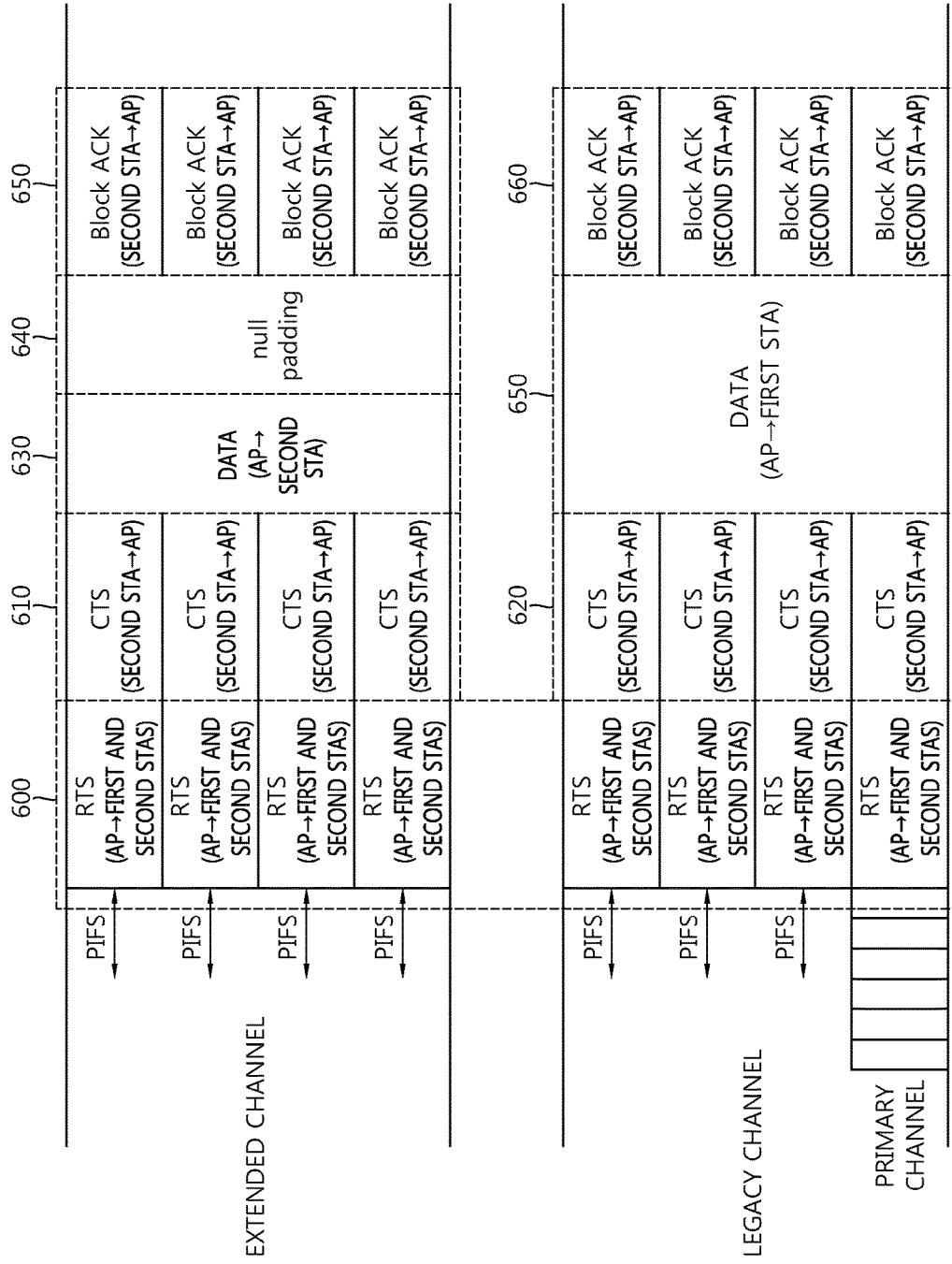
FIG. 6 is a conceptual diagram illustrating a method for transmitting downlink data by an AP according to the embodiment of the present invention.

FIG. 6 is a conceptual diagram illustrating a method for transmitting downlink data by the AP according to the embodiment of the present invention.

In FIG. 6, a method is disclosed, in which the AP transmits data to the legacy STA and the extended STA in respective 80 MHz channel bands by using an 80 MHz legacy channel band (hereinafter, referred to as a 80 MHz legacy channel) and an 80 MHz extended channel band (hereinafter, referred to as a 80 MHz extended channel). The 80 MHz legacy channel may include 4 20 MHz legacy channel bands (hereinafter, referred to as a 20 MHz legacy channel). The 80 MHz extended channel may include 4 20 MHz extended channel bands (hereinafter, referred to as a 20 MHz extended channel). Hereinafter, in the embodiment of the present invention, the respective channels are disclosed as the divided channel bands for easy description, but may be regarded as multiple channel bands without dividing the channel bands. The multiple channels may include 8 20 MHz channels.

The AP may configure one 20 MHz legacy channel among 4 20 MHz legacy channels included in the 80 MHz legacy channels as the primary channel. The AP may perform a back-off procedure for channel access with respect to the configured primary channel.

The AP may verify a channel state of a secondary channel during a PIFS interval before a back-off timer expires. The secondary channel may include residual 20 MHz legacy channels and 20 MHz extended channels included in the 80 MHz legacy channel and the 80 MHz extended channel other than the primary channel.

The AP may determine the state of the channel for the point coordination function (PCF) interframe space) time before starting TXOP in order to determine whether the second channel is idle or busy.

When the secondary channel is idle for the PIFS time, the AP may determine that the state of the secondary channel is idle. In FIG. 6, it is described that it is assumed that all secondary channels are idle for easy description, but a channel determined as a busy state among the secondary channel may be present.

The AP may transmit an RTS frame 600 in a duplicated PHY protocol data unit (PPDU) format through the primary channel which the AP accesses and the respective secondary channels of which channel states are determined as the idle state. The RTS frame 600 in the duplicated PHY protocol data unit (PPDU) format may be a form acquired by duplicating an RTS frame format transmitted in the 20 MHz channel. The AP may transmit the RTS frame 600 at a similarly set time.

In FIG. 6, since all of 7 secondary channels are in the idle state, the AP may transmit the RTS frame 600 in the duplicated PHY protocol data unit (PPDU) format in 8 20 MHz channels including the primary channel and the secondary channels.

The RTS frame 600 transmitted by the AP may include information on an STA that receives the RTS frame 600 and information on a reception channel which the STA will use. The STA that receives the RTS frame may be the legacy STA and/or the extended STA. For example, the RTS frame 600 may include a list of STAs that receive the RTS frame 600 and a list of channels which the AP uses to transmit the downlink data to the STA according to the embodiment.

Figure 7:
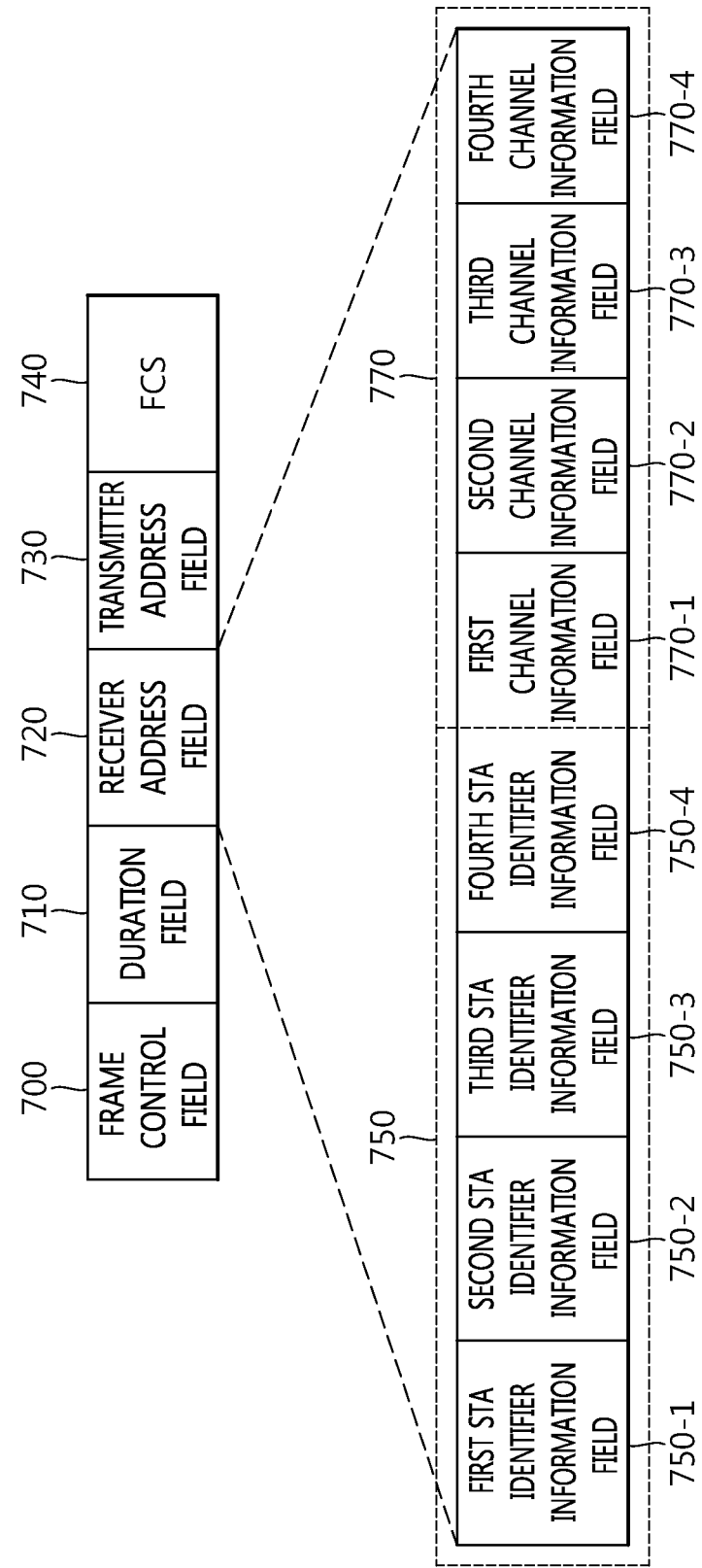
FIG. 7 is a conceptual diagram illustrating an RTS frame format for supporting a method for transmitting a downlink based on FDMA according to the embodiment of the present invention.

FIG. 7 is a conceptual diagram illustrating the RTS frame format for supporting a method for transmitting a downlink based on the FDMA according to the embodiment of the present invention.

Referring to FIG. 7, the RTS frame (hereinafter, referred to as 'RTS frame) for supporting the downlink transmitting method based on the FDMA may include a frame control field 700, a duration field 710, a receiver address field 720, a transmitter address field 730, and a frame check sequence (FCS) field 740.

The frame control field 700 may include information for indicating a transmitted frame type. For example, the frame control field 700 may include information for indicating that the transmitted RTS frame is a frame used to start the downlink transmission based on the FDMA.

The duration field 710 may include information for updating the network allocation vector (NAV) of the STA that receives the RTS frame. Alternatively, the duration field 710 may be used to configure information (e.g., a transmission start time and/or a transmission end time) associated with a transmission time of the transmitted and received frame in the embodiment of the present invention. For example, the duration field 710 may be used to configure a time when the STA transmits the CTS frame. Alternatively, the duration field 710 may include information on a maximum transmission time (alternatively, a maximum transmission duration) of a frame transmitted after the same RTS frame as the CTS frame. The STA that receives the RTS frame may transmit the CTS frame based on the duration field.

The transmitter address field 730 may include information on an address of the STA that transmits the RTS frame.

The FCS field 740 may include information for discovering an error which occurs in the frame.

The receiver address field 720 may include information on the STA that receives the RTS frame and information on a reception channel which the STA will use at the time of receiving the downlink data. For example, the receiver address field may include an STA identifier information field 750 and a channel information field 760. When multiple (e.g., 4) STAs that will receive the downlink data are present, multiple STA identifier information fields may be allocated. The channel information field may include information on a channel allocated when the multiple STAs that receives the downlink data receives the downlink data.

For example, a first STA identifier information 750-1 may include information on a partial AID other than 1 most significant bit (MSB) among 11 association identifier (AID) bits used as identifier information of a first STA. Similarly, a second STA identifier information 750-2 may include information on a partial AID of a second STA, a third STA identifier information 750-3 may include information on a partial AID of a third STA, and a fourth STA identifier information 750-4 may include information on a partial AID of a fourth STA.

According to the embodiment of the present invention, the STA that receives the RTS frame transmitted by the AP may determine that the received RTS frame is the RTS frame transmitted from the AP that performs the downlink transmission based on the FDMA by considering information on a frame type of the RTS frame. Further, the STA may identify that the identifier information included in the receiver address field 720 is partial AID information based on the type information of the RTS frame. It may be determined whether the STA is the STA that receives the downlink data from the AP based on the partial AID information included in the RTS frame.

As another embodiment, a value of the AID of the STA that supports the downlink transmitting method based on the FDMA may be configured as a value that belong to a specific range such as 1 t 1024 or 1025 to 2048. It may be assumed that the value of the AID of the STA has the value in the range of 1 to 1024 and the RTS frame received by the STA is the RTS frame for the downlink transmission based on the FDMA. In this case, the STA may find that the receiver address field of the RTS frame includes information (e.g., a list of partial AIDs) on the partial AID. The STA may determine all AID values from the partial AIDs by configuring the MSB of the partial AID included in the receiver address field as 0. The STA may determine whether the STA is designated as an STA that will receive data from the AP based on all determined AIDs.

A first channel information field 770-1 included in the receiver address field 720 may include information on a channel bandwidth allocated to the first STA and a second channel information field 770-2 may include information on a channel bandwidth allocated to the second STA. When it is assumed that the second STA uses a channel adjacent to the first STA, offset information between a first channel allocated to the first STA and a second channel allocated to the second STA may not be separately transmitted in the channel information field. For example, the first channel information field 770-1 may include channel band information based on the primary channel and the second channel information field 770-2 may be a channel field just adjacent to the first channel allocated based on the first channel information field. When the first channel and the second channel are not adjacent channels, information on a channel offset is additionally transmitted to the channel information field to transmit information on the position of the second channel based on the first channel.

Similarly, a third channel information field 770-3 may include information on a channel bandwidth allocated to the third STA and a fourth channel information field 770-4 may include information on a channel bandwidth allocated to the fourth STA.

Figure 8:
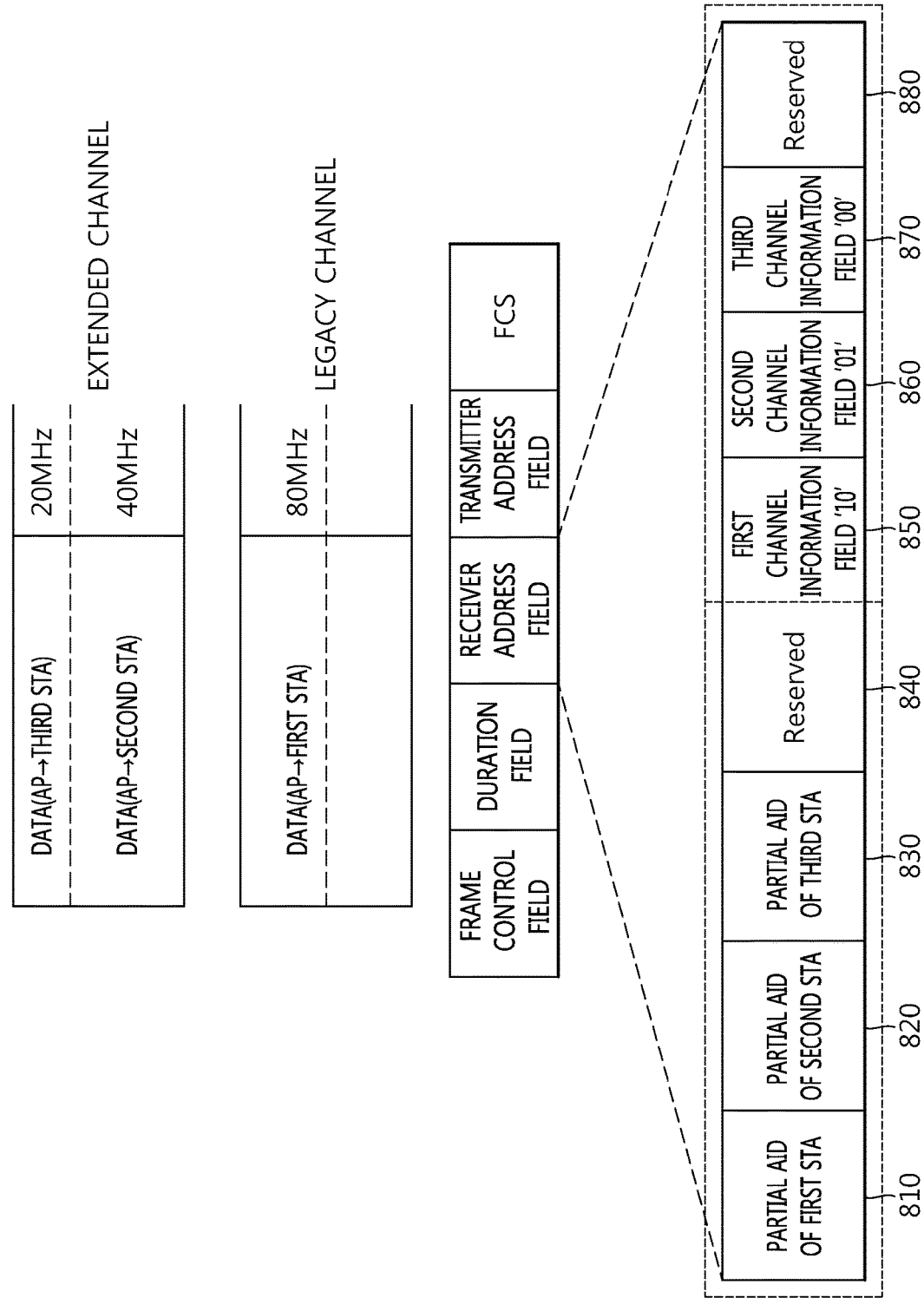
FIG. 8 is a conceptual diagram illustrating the method for transmitting a downlink based on the FDMA according to the embodiment of the present invention.

FIG. 8 is a conceptual diagram illustrating a method for transmitting a downlink based on the FDMA according to the embodiment of the present invention.

In FIG. 8 it is exemplarily described that it is assumed that downlink transmission channels are allocated to 3 STAs.

Referring to FIG. 8, the first STA is allocated with the 80 MHz legacy channel to receive data from the AP. The second STA is allocated with the 40 MHz extended channel and the third STA is allocated with the second 20 MHz extended channel to receive data from the AP.

The receiver address field of the RTS frame transmitted by the AP may include the STA identifier information field and the channel information field.

First STA identifier information 810 may include information on a partial AID (e.g., 10 bits) of the first STA, second STA identifier information 820 may include information on a partial AID of the second STA, and third STA identifier information 830 may include information on a partial AID of the third STA. When fourth STA identifier information is configured in the receiver address field as illustrated in FIG. 7, the fourth STA is not present, and as a result, the fourth STA identifier information 840 may be configured as a reserved value.

Further, a first channel information field 850 of the receiver address field may include information on a downlink channel bandwidth allocated to transmit data to the first STA, a second channel information field 860 may include information on a downlink channel bandwidth allocated to transmit data to the second STA, and a third channel information field 870 may include information on a downlink channel bandwidth allocated to transmit data to the third STA. For example, when it is assumed that the channel information field is '10' as information of 2 bits, the channel information field indicates the 80 MHz channel bandwidth, when the channel information field is '01', the channel information field indicates the 40 MHz channel bandwidth, and when the channel information field is '00', the channel information field indicates the 20 MHz channel bandwidth, '10' may be configured in the first channel information field, '01' may be configured in the second channel information field, and '00' may be configured in the third channel information field. Since the fourth STA is not present, a fourth channel information field 880 may be configured as '11' which is a reserved value.

The receiver address field disclosed in FIGS. 7 and 8 is one exemplary information format for transmitting information on the STA that receives the RTS frame and information on the downlink channel which the AP uses to transmit the downlink data to the STA. That is, the receiver address field may be implemented in various formats in order to transmit the information on the STA that receives the RTS frame and the information on the downlink channel used to transmit the data to the STA. For example, when a list of the multiple STAs is configured and managed by the unit of a group, a value of an identifier for a specific STA group may be configured as the receiver address field of the RTS frame. For example, when the first STA, the second STA, the third STA, and the fourth STA are configured as one group, identifier information (e.g., group ID 10) of one configured group may be used while being included in the receiver address field of the RTS frame.

Referring back to FIG. 6, the STA that receives the RTS frame 600 may identify that the STA corresponds to an STA that receives the downlink transmission data from the AP based on the STA identifier information included in the RTS frame. Further, when the STA that receives the RTS frame 600 is the STA that receives the downlink transmission data, the STA may move to a reception channel indicated based on the channel information field included in the RTS frame 600. When a current channel of the STA is the reception channel indicated based on the channel information field, the STA may receive data transmitted from the AP in the current channel.

The STA may transmit the CTS frame 610 to the AP in the reception channel indicated based on the channel information field as a response to the received RTS frame 600. The CTS frame 610 may be the CTS frame 610 in the duplicated PPDU format. Different STAs may transmit the CTS frame 610 based on transmission time information of the CTS frame included in the RTS frame transmitted by the AP. Each of the multiple STAs may transmit the CTS frame 610 based on the maximum transmission time (alternatively, maximum transmission duration) of the CTS frame 610 included in the duration field of the received RTS frame 600. Duration fields of the RTS frames 600 which the AP transmits to the multiple STAs may be configured as the same value and the multiple STAs may transmit the CTS frame 610 based on the same duration field value.

For example, the STA may configure a time to transmit the CTS frame 610 based on the duration field information included in the RTS frame 600.

The channel bandwidth of the channel in which the CTS frame 610 is transmitted may be determined based on the channel information field included in the RTS frame 600. That is, the channel bandwidth in which the STA transmits the CTS frame 610 may be a channel bandwidth allocated to the STA through the RTS frame 600. The channel bandwidth allocated for the STA to transmit the CTS frame 610 may be not larger than the channel bandwidth allocated to the STA through the RTS frame 600.

The AP that receives the CTS frame 610 from the first STA and the second STA may downlink-transmit data frames 630 and 650 to the first STA and the second STA. The AP may transmit the data frame 650 to the first STA through 4 respective 20 MHz legacy channels included in the 80 MHz legacy channel. The AP may transmit the data frame 630 to the second STA through 4 respective 20 MHz extended channels included in the 80 MHz extended channel.

When the AP transmits the data frames 630 and 650 to the STA, the sizes of the data frames transmitted to the respective STAs may be different from each other and modulation coding schemes (MCS) used to transmit the downlink data may be different from each other. Accordingly, an issue in which transmission durations required for the AP to transmit the data frames 630 and 650 to the respective STAs are different from each other may occur. In the embodiment of the present invention, it may be implemented in such a manner that the transmission durations when the AP transmits the data frame to the respective STAs are configured to be the same as each other.

The AP may configure a transmission end time of the data frame similarly at the time of transmitting the data frames 630, 640, and 650 to the first STA and the second STA. For example, when the AP first completes transmission of the effective data frame 630 to the second STA, the AP may transmit the data frame 640 which is null padded to the second STA until transmission of the data frame 650 to the first STA ends. By using such a method, a time at which the AP completes the transmission of the data frame 650 to the first STA and a time at which the AP completes the transmission of the data frames 630 and 640 to the second STA may be configured to be the same as each other.

The first STA and the second STA may transmit block ACKs 650 and 660 as responses to the data frames 630 and 650 transmitted from the AP. The block ACKs 650 and 660 may be transmitted in the respective channels allocated to the first STA and the second STA. For example, the first STA may transmit the block ACK 650 through 4 respective 20 MHz legacy channels included in the 80 MHz legacy channel. Further, the second STA may transmit the block ACK 660 through 4 respective 20 MHz extended channels included in the 80 MHz extended channel.

The first STA and the second STA may determine the transmission time of the block ACKs 650 and 660 based on the fields (e.g., duration fields) included in the data frames 630 and 650 which the AP transmits to the first STA and the second STA.

In detail, the respective STAs that receive the data frame in the respective channels transmit the block ACK to the AP through the allocated channels to transmit information regarding whether to receive the data frame to the AP. In this case, since the respective STAs transmit the block ACK to the AP by using different channels, times when the respective STAs transmit the block ACK need to be the same as each other. To this end, the AP may transmit the data frame including the information regarding the transmission time of the block ACK to the respective STAs in order to adjust the transmission time of the block ACK to be the same as each other.

As illustrated in FIG. 6, it may be assumed that the AP transmits the first data frame 650 to the first STA through the legacy channel and transmits the second data frame to the second STA through the extended channel. In this case, information included in the duration field of the first data frame transmitted to the first STA and the second STA and information included in the duration fields of the second data frames 630 and 640 may be configured as the same value. The duration field may include information on the transmission time of the block ACK which the STA will transmit after receiving the data frame. Each of the first STA and the second STA may transmit the block ACK based on the information on the duration field of the received data frame.

In the embodiment of the present invention, it is disclosed that the transmission times of the block ACK by different STAs are configured to be the same as each other based on the field included in the data frame, but the transmission times of the block ACK may be configured to be the same as each other by using various other methods (e.g., field information included in another frame).

In the embodiment of the present invention, the respective channels are disclosed as the divided channel bands for easy description, but may be regarded as multiple channel bands without dividing the channel bands.

For example, the AP may transmit multiple RTS frames to multiple STAs through multiple channels and the AP may receive the CTS frame from at least one of the multiple STAs through at least one channel of the multiple channels.

The CTS frame may be transmitted from at least two STAs of the multiple STAs to the AP through at least two channels of the multiple channels, respectively. In this case, the AP may transmit multiple data frames to at least two STAs of the multiple STAs. The multiple respective data frames may be transmitted to correspond to at least two STAs of the multiple STAs, respectively.

Figure 9:
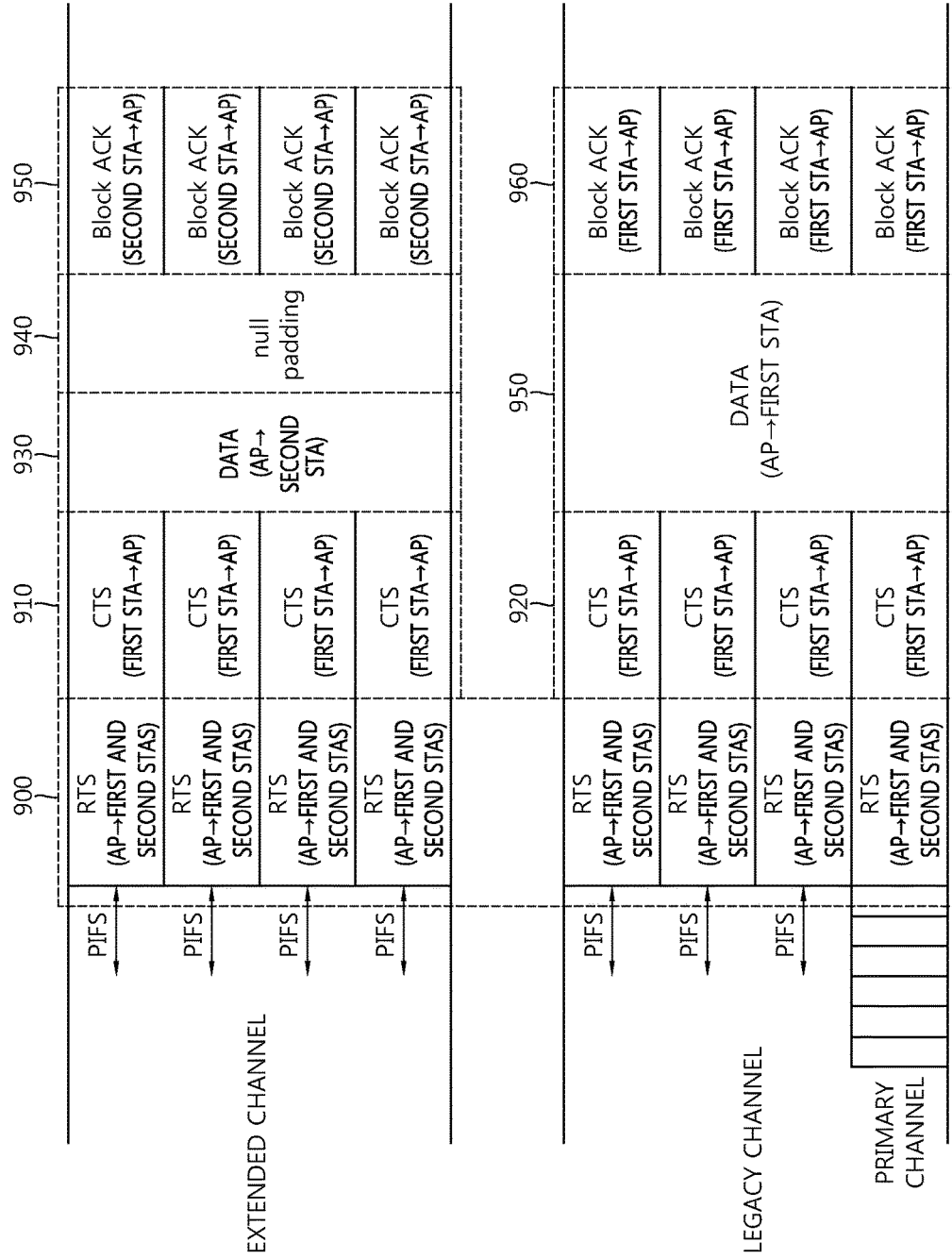
FIG. 9 is a conceptual diagram illustrating the method for transmitting a downlink based on the FDMA according to the embodiment of the present invention.

FIG. 9 is a conceptual diagram illustrating a method for transmitting a downlink based on the FDMA according to the embodiment of the present invention.

Unlike FIG. 6, in FIG. 9, the first STA that operates in the primary channel may transmit the CTS frame by using both the legacy channel and the extended channel.

The AP may transmit the RTS frame to the first STA and the second STA. Alternatively, the AP may transmit the RTS frame to only the first STA. The first STA and the second STA may support both the legacy channel and the extended channel. In FIG. 9, it is assumed that the AP transmits the RTS frame to the first STA and the second STA.

The AP may transmit the RTS frame in the duplicated frame format through the entire channel bandwidth (the legacy channel and the extended channel to perform the downlink transmission. A terminal that receives the RTS frame may verify an available channel during the PIFS before transmitting the CTS frame and transmit the CTS frame through the available channel.

According to the embodiment of the present invention, the first STA that operates in the primary channel may determine information regarding whether the entire bandwidth to perform the downlink transmission is available. When the entire bandwidth is available, the first STA may transmit the CTS frame with respect to the entire bandwidth for the second STA. The second STA may not transmit a separate CTS frame.

The AP may receive the CTS frame from the first STA and transmit the data frames through the channels allocated to the first STA and the second STA, respectively. The transmission times of the data frames may have the same value. A data frame in which transmission of effective data is first completed may include null padding. The respective STAs that receive the data frames may transmit the block ACKs to the AP. The AP may transmit the respective data frames including information for configuring the times when the respective STAs transmit the block ACKs to be the same as each other.

Hereinafter, in the embodiment of the present invention, a method for performing the downlink transmission based on the FDMA by using the existing RTS frame and CTS frame formats will be disclosed.

Figure 10:
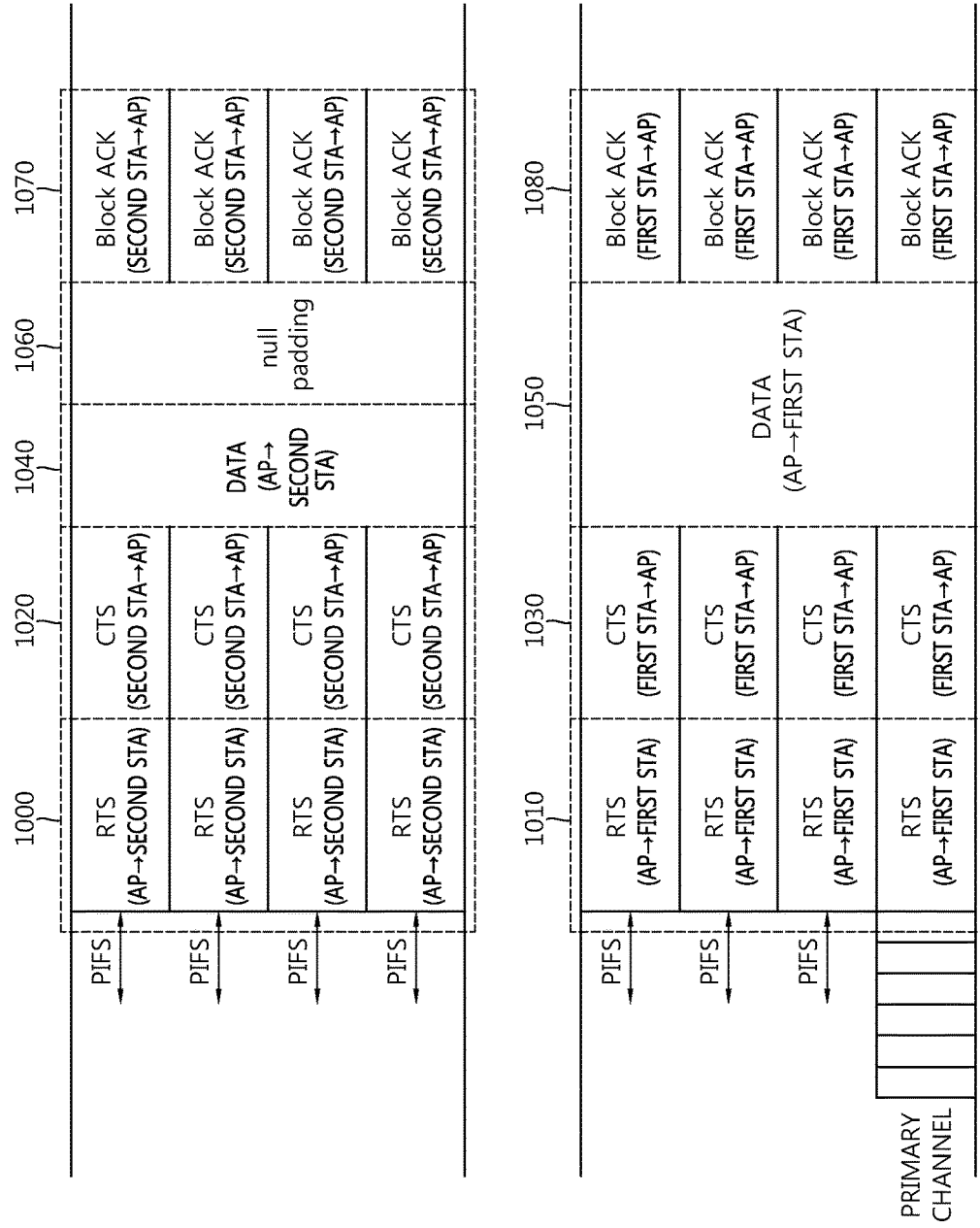
FIG. 10 is a conceptual diagram illustrating the method for transmitting a downlink based on the FDMA according to the embodiment of the present invention.

FIG. 10 is a conceptual diagram illustrating the method for transmitting a downlink based on the FDMA according to the embodiment of the present invention.

In FIG. 10, disclosed is a method for transmitting a downlink by the AP when the AP finds an operating channel of a specific STA. The AP may obtain information on the operating channel of the specific STA based on various methods. For example, the AP may obtain the information on the operating channel of the specific STA based on information in which the AP previously performs network with the specific STA or obtain information on a current operating channel of the specific STA based on the current operating channel of the STA, which the specific STA transmits or a movement operating channel of the STA.

Hereinafter, in the embodiment of the present invention, a downlink transmitting operation of the AP when the extended STA in which the extended channel is available notifies to the AP that the operating channel moves to the extended channel will be disclosed.

Even in FIG. 10, a method is described, in which the AP transmits data to the legacy STA and the extended STA in respective 80 MHz channel bands by using the 80 MHz legacy channel (hereinafter, referred to as the 80 MHz legacy channel) and the 80 MHz extended channel (hereinafter, referred to as the 80 MHz extended channel). The 80 MHz legacy channel may include 4 20 MHz legacy channels. Further, the 80 MHz extended channel may include 4 20 MHz extended channels.

The AP may perform the back-off procedure for channel access with respect to the configured primary channel. The AP may verify the channel state of the secondary channel during a predetermined time interval (e.g., PIFS) before starting the TXOP as the back-off timer expires. The AP may determine the state of the channel for the PIFS time in order to determine whether the secondary channel is idle or busy.

When the secondary channel is idle for the PIFS time, the AP may determine that the state of the secondary channel is idle. Even in FIG. 10, it is described that it is assumed that all secondary channels are idle for easy description.

The AP may transmit RTS frames 1000 and 1010 through the primary channel which the AP accesses and the respective primary channel and the secondary channels of which channel states are determined as the idle state.

A receiver address field of a first RTS frame 1010 which the AP transmits through the legacy channel may include identifier information (e.g., an MAC address of the first STA) of the first STA that may operate in the legacy channel.

A receiver address field of a second RTS frame 1000 which the AP transmits through the extended channel may include identifier information (e.g., an MAC address of the second STA) of the second STA that may operate in the extended channel. The second STA may transmit information indicating that the second STA moves to the extended channel to the AP in advance. The AP may transmit the second RTS frame 1000 to the second STA through the extended channel based on the information.

The first STA that receives the first RTS frame 1010 from the AP and The second SA that receives the second RTS frame 1000 from the AP may transmit CTS frames 1020 and 1030 to the respective channels through which the first and second STAs receive the RTS frames 1000 and 1010. The first STA and the second STA may transmit the CTS frames 1020 and 1030 at configured times. For example, the AP may configure transmission times of the CTS frames 1020 and 1030 by the first STA and the second STA based on information (e.g., information on the duration field) included in the RTS frames 1020 and 1030. For example, the duration fields of the first RTS frame 1010 which the AP transmits to the first STA and the second RTS frame 1020 which the AP transmits to the second STA may be configured as the same value. The information on the duration field included in each RTS frame may information on a maximum transmission time (alternatively, a maximum transmission duration) when the CTS frames 1020 and 1030 transmitted by each STA are transmitted.

The first STA and the second STA may transmit the CTS frames 1020 and 1030 in the duplicated PPDU format to the AP according to the channel bandwidth.

The AP that receives the CTS frames 1020 and 1030 from the first STA and the second STA may perform the downlink transmission through the channels allocated to the first STA and the second STA. In detail, the AP may transmit the data frame 1050 to the first STA through the legacy channel and the AP may transmit the data frames 1040 and 1060 to the second STA through the extended channel. The AP may adjust transmission times when the AP transmits the data frames 1040, 1050, and 1060 to the respective STAs to be the same as each other. For example, the AP may adjust the transmission times of the data frames 1040, 1050, and 1060 to the multiple STAs by using the method such as the null padding.

Similarly as described above, the AP may transmit the data frame including the information regarding the transmission time of the block ACK to the respective STAs in order to adjust the transmission time of the block ACK to be the same as each other. Each STA may transmit the block ACK based on the information associated with the transmission time of the block ACK included in the data frame.

Figure 11:
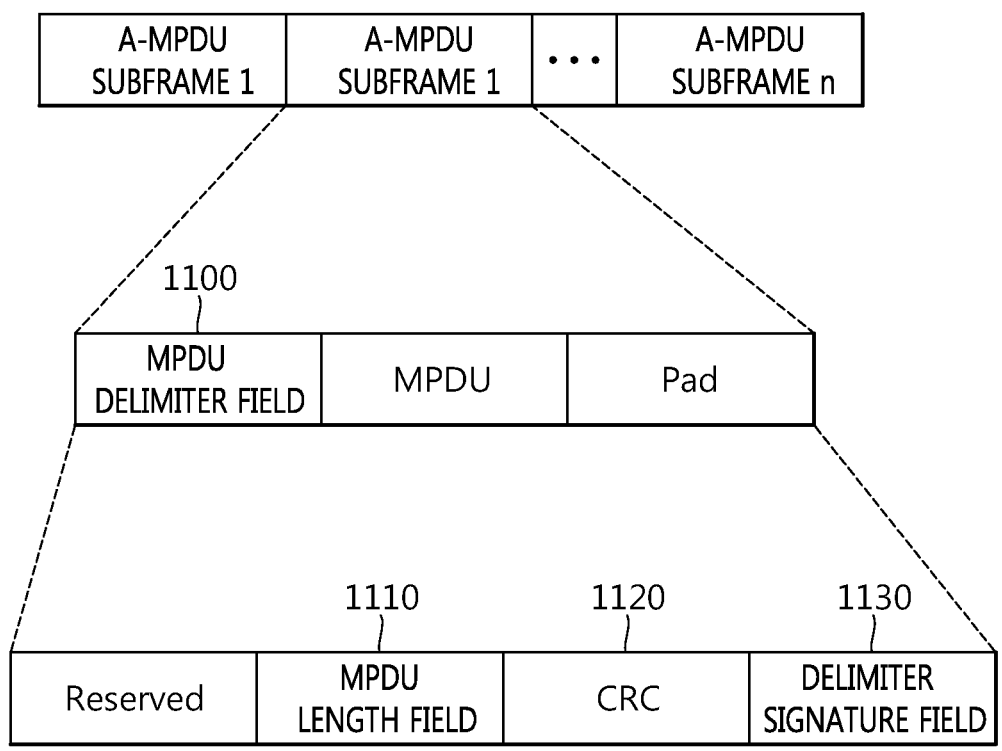
FIG. 11 is a conceptual diagram illustrating a null padding method by the AP according to the embodiment of the present invention.

FIG. 11 is a conceptual diagram illustrating a null padding method by the AP according to the embodiment of the present invention.

Referring to FIG. 11, null padding may be implemented on an MAC layer in an aggregated MAC protocol data unit (A-MPDU) format.

The AP may transmit the data frame in the A-MPDU format acquired by aggregating the MPDU. The null padding may be implemented by transmitting only a subframe header of the A-MPDU.

Each A-MPDU format may include multiple A-MPDU subframes. Each A-MPDU subframe may include an MPDU delimiter field 1100, the MPDU, and a padding bit.

The MPDU delimiter field 1100 may include an MPDU length field 1110, a cyclic redundancy check (CRC) 1120, and a delimiter signature field 1130.

The length field 1110 may include information on the length of the MPDU, the CRC 1120 may include information for error checking, and the delimiter signature field 1130 may include information for scanning an MPDU delimiter.

According to the embodiment of the present invention, the AP may encode and fill multiple A-MPDU subframes positioned at a temporally lower priority in the A-MPDU frame format with only the MPDU delimiter field for the null padding. For example, the AP repeatedly transmits the MPDU delimiter in which the MPDU length field is configured as 0 to perform the null padding.

That is, a time when transmission of the multiple data frames transmitted by the AP ends may be the same as a time when transmission of a maximum interval transmission data frame ends. The maximum interval transmission data frame may be a frame in which effective downlink data is transmitted by the AP during the longest interval. The effective downlink data may be data which needs to be actually downlink-transmitted to the STA. The effective downlink data may be downlink data which is not null-padded. For example, the effective downlink data may be transmitted while being included in the MPDU. Residual data frames other than the maximum interval transmission data frame among the multiple data frames may be null-padded.

FIG. 12 is a conceptual diagram illustrating a method for transmitting a data frame according to the embodiment of the present invention.

In the downlink transmitting method based on the FDMA according to the embodiment of the present invention, guard intervals used in the data frames transmitted to the respective STAs may be configured as the same guard interval. The reason is that since a long guard interval (LGI) adopts a guard interval of 0.8 us and a short guard interval (SGI) adopts a guard interval of 0.4 us, when a specific channel uses LGI and another channel uses the SGI, the times when the AP completes the downlink transmission may be the same as each other.

According to the embodiment of the present invention, all downlink channels use the same guard interval to configure the completion times of transmission of the data frames to the multiple STAs to be the same as each other. The guard intervals used in the respective data frames transmitted to the multiple STAs may be selected as one of the SGI and the LGI. That is, the guard interval of the data frame which the AP transmits to each STA at a specific time may be selected and used as one of the SGI and the LGI.

In detail, referring to an upper end of FIG. 12, when a first data frame 1210 transmitted to the first STA is configured to use the SGI, a second data frame 1220 transmitted to the second STA may be configured to use the SGI.

On the contrary, referring to a lower end of FIG. 12, when a first data frame 1250 transmitted to the first STA is configured to use the LGI, a second data frame 1260 transmitted to the second STA may be configured to use the LGI.

It may be assumed that the AP transmits data to the STA by using a transmission method such as multi-user (MU)-multiple input multiple output (MIMO). In this case, the AP may transmit multiple spatial streams to the first STA and the second STA. As described above, when it is assumed that the AP transmits data to the first STA based on 4 20 MHz legacy channels and the AP transmits data to the second STA based on 4 20 MHz extended channels, the AP may transmit the data to the first STA through 4 spatial streams and to the second STA through 4 another spatial streams.

When a transmission method using MIMO, the number of long training fields (LTF) which are fields used for channel prediction, and synchronization of a frequency and the time, which are included in the data frame may vary depending on the number of spatial streams.

Figure 13:
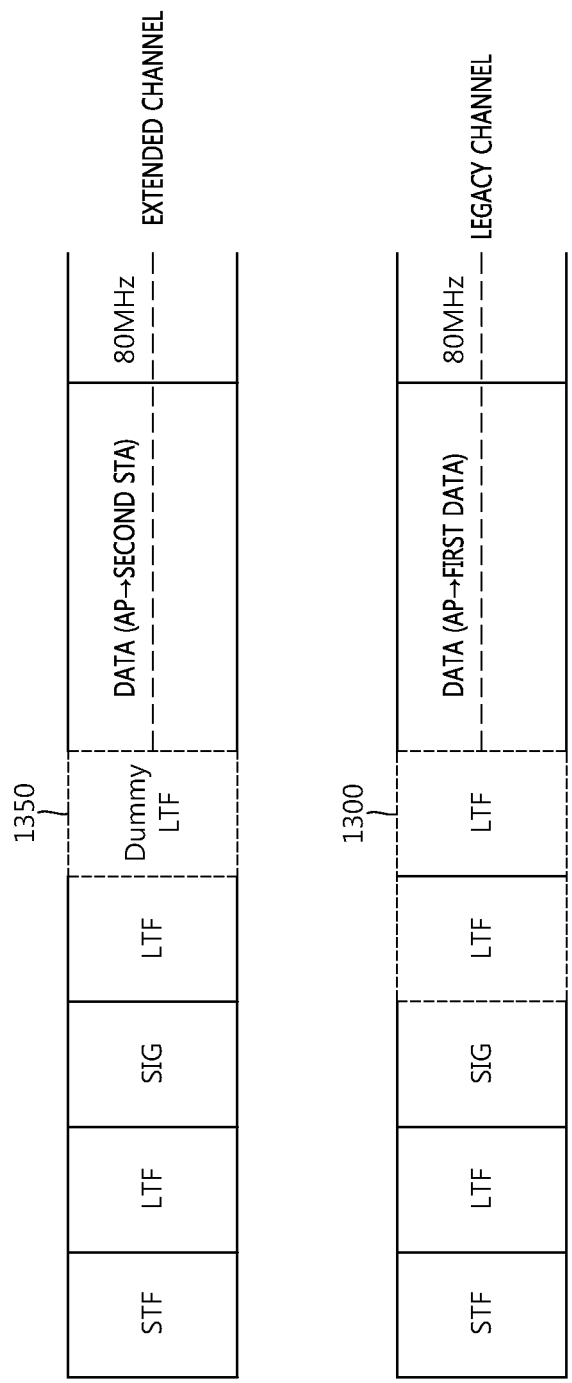
FIG. 13 is a conceptual diagram illustrating a frame structure by the transmission method according to the embodiment of the present invention.

FIG. 13 is a conceptual diagram illustrating a frame structure by the transmission method according to the embodiment of the present invention.

Referring to a lower end of FIG. 13, the data frame which the AP transmits to the first STA based on the legacy channel is illustrated. It may be assumed that the AP uses two spatial streams at the time of transmitting data to the first STA based on the legacy channel. In this case, two LTFs 1300 are included in the data frame transmitted by the AP to be generated.

It is assumed that the AP uses one spatial stream at the time of transmitting the data frame to the second STA based on the extended channel. When one spatial stream is used, one LTF may be included in the data frame. In this case, transmission completion times of the data frames which the AP transmits to the first STA and the second STA may be different from each other. For example, the LTF uses the LGI during transmission and when the SGI is used during transmitting the data, the completion time of the transmission of the data frame to the first STA and the completion time of the transmission of the data frame to the second STA may be different from each other. Therefore, in the embodiment of the present invention, when the numbers of spatial streams used to transmit the data frame to the multiple STAs are different from each other, a dummy LTF 1350 is added to the data frame which may be transmitted. For example, the dummy LTF 1350 may be included in a PLCP preamble or a PLCP header of the data frame. By using such a method, the completion times of the downlink transmission to the multiple STAs may be configured to be the same as each other.

That is, in addition to an LTF including a channel prediction sequence required for a spatial stream actually transmitted to the STA, the LTF is additionally inserted in order to adjust the numbers of LTFs to be the same as each other in respective channels.

As illustrated in FIG. 12, the number of spatial streams actually transmitted to the second STA is one, but one dummy LTF 1350 may be added to the data frame. That is, the AP may generate the data frames so that the numbers of LTFs included in the respective data frames transmitted to the first STA and the second STA are the same as each other as two. The AP may configure the number of LTFs included in the data frame based on the maximum number of spatial streams used for transmission to a specific STA.

Figure 14:
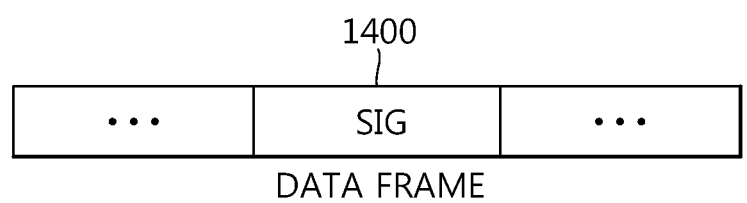
FIG. 14 is a conceptual diagram illustrating a PLCP header according to the embodiment of the present invention.

FIG. 14 is a conceptual diagram illustrating the data frame according to the embodiment of the present invention.

Referring to FIG. 14, the data frame may include information associated with a dummy LTF in an SIG field 1400.

For example, the SIG field 1400 may include the number of spatial streams used to actually transmit the data frame and the total number of LTFs in order to support the dummy LTF. When the case illustrated in FIG. 13 is assumed, the SIG field 1400 of the data frame transmitted to the second STA may include information indicating that the number of spatial streams is one and the total number of LTFs is two.

As another embodiment, the SIG field 1400 may directly include the number of dummy LTFs instead of the total number of LTFs. For example, when the case illustrated in FIG. 13 is assumed, the SIG field 1400 of the data frame transmitted to the second STA may include information indicating that the number of dummy LTFs is one.

The SIG field is one example and the SIG field 1400 according to the embodiment of the present invention may include information on the number of used spatial streams, information (e.g., information regarding presence of the dummy LTF and information to determine the number of dummy LTFs) associated with the dummy LTF.

FIG. 15 is a conceptual diagram illustrating a method for configuring a frame transmission time in the downlink transmitting method based on the FDMA according to the embodiment of the present invention.

In FIG. 15, disclosed is a method in which the multiple STAs transmit the block ACK to the AP at a configured time, but such a method may also be used for the multiple STAs and multiple APs to start or complete transmission of different data or signals at the configured time.

Referring to FIG. 15, the respective STAs that receive the data frame in the respective channels transmit the block ACKs to the AP through the allocated channels to notify whether to receive the data frame. When the STAs transmit the block ACKs by using different channels, the transmission times of the block ACKs need to be configured to be the same as each other.

Information on the transmission times of the block ACKs transmitted by the multiple STAs is included in the data frame which may be transmitted in order to configure the transmission times of the block ACKs transmitted by the multiple STAs to be the same as each other.

In detail, the respective STAs that receive the data frame in the respective channels transmit the block ACKs to the AP through the allocated channels to transmit information regarding whether to receive the data frame to the AP. In this case, since the respective STAs transmit the block ACKs to the AP by using different channels, the times when the respective STAs transmit the block ACK need to be the same as each other. To this end, the AP may transmit the data frame including the information regarding the transmission time of the block ACK to the respective STAs in order to adjust the transmission time of the block ACK to be the same as each other.

It may be assumed that the AP transmits the data frame to the first STA through the legacy channel and the AP transmits the data frame to the second STA through the extended channel. In this case, a field (e.g., duration field) 1500 of the first data frame transmitted to the first STA may include information on a time 1550 when the first STA transmits the block ACK as a response to the data frame. Further, a field (e.g., duration field) 1500 of the second data frame transmitted to the second STA may include information on a time 1550 when the second STA transmits the block ACK as a response to the data frame. For example, the duration fields included in the first data frame and the second data frame may include the same value. In this case, the first STA and the second STA may obtain information on the transmission time of the block ACK based on the duration fields included in the received data frames and transmit the block ACK.

Figure 16:
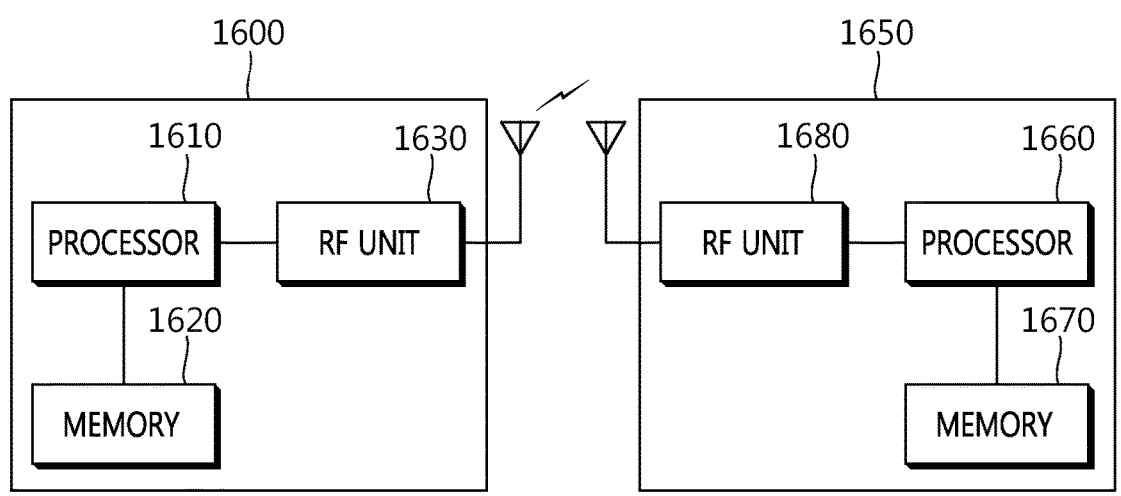
FIG. 16 is a block diagram illustrating a wireless apparatus to which the embodiment of the present invention can be applied.

FIG. 16 is a block diagram illustrating a wireless device to which an embodiment of the present invention may apply.

Referring to FIG. 16, the wireless device may be an STA that may implement the above-described embodiments, and the wireless device may be an AP 1650 or a non-AP STA (or STA)(1600).

The STA 1600 includes a processor 1610, a memory 1620, and an RF (Radio Frequency) unit 1630.

The RF unit 1630 may be connected with the processor 1620 to transmit/receive radio signals.

The processor 1620 implements functions, processes, and/or methods as proposed herein. For example, the processor 1620 may be implemented to perform the operation of the above-described wireless device according to an embodiment disclosed in FIG. 6 to FIG. 15 of the present invention.

For example, the processor 1620 may determine the time to transmit the CTS frame based on the RTS frame transmitted by the AP. Further, the processor 1620 may determine a channel to receive downlink data based on the received RTS frame.

The AP 1650 includes a processor 1660, a memory 1670, and an RF (Radio Frequency) unit 1680.

The RF unit 1680 may be connected with the processor 1660 to transmit/receive radio signals.

The processor 1660 implements functions, processes, and/or methods as proposed herein. For example, the processor 1660 may be implemented to perform the operation of the above-described wireless device according to an embodiment disclosed in FIG. 6 to FIG. 15 of the present invention.

For example, the processor 1660 may transmit multiple RTS frames to multiple STAs through multiple channels, respectively. Further, the processor 1660 may be implemented to receive the CTS frame from at least one of the multiple STAs through at least one channel of the multiple channels. Each of the multiple RTS frames may include channel information indicating a channel to be used when performing downlink transmission to the multiple STAs among the multiple channels and identifier information indicating the multiple STAs.

The processor 1610, 1620 may include an ASIC (Application-Specific Integrated Circuit), other chipset, a logic circuit, a data processing device, and/or a converter that performs conversion between a baseband signal and a radio signal. The memory 1620, 1670 may include a ROM (Read-Only Memory), a RAM (Random Access Memory), a flash memory, a memory card, a storage medium, and/or other storage device. The RF unit 1630, 1680 may include one or more antennas that transmit and/or receive radio signals.

When an embodiment is implemented in software, the above-described schemes may be embodied in modules (processes, or functions, etc.) performing the above-described functions. The modules may be stored in the memory 1620, 1670 and may be executed by the processor 1610, 1660. The memory 1620, 1670 may be positioned in or outside the processor 1610, 1660 and may be connected with the processor 1610, 1660 via various well-known means.

What is claimed is:

1. A method for multi-user channel access in a wireless local area network (WLAN), the method comprising:
   transmitting, by an access point (AP), a multi-user request to send (MU RTS) frame to a first station (STA) and a second STA to simultaneously solicit uplink multi-user transmissions,
   wherein the MU RTS frame includes:
     first association identifier (AID) information for the first STA,
     second AID information for the second STA,
     first resource allocation information for a first uplink channel allocated to the first STA identified by the first AID information, and
     second resource allocation information for a second uplink channel allocated to the second STA identified by the second AID information; and
   simultaneously receiving, by the AP, a first clear to send (CTS) frame and a second CTS frame from the first STA and the second STA in response to the MU RTS frame,
   wherein the first CTS frame is received via the first uplink channel based on the first resource allocation information, and
   wherein the second CTS frame is received via the second uplink channel based on the second resource allocation information.

2. The method of claim 1, further comprising:
   transmitting, by the AP, a plurality of data frames to the first STA and the second STA after receiving the first and second CTS frames,
   wherein each of the plurality of data frames is transmitted to each of the first STA and the second STA.

3. The method of claim 2,
   wherein a time when the transmission of the plurality of data frames ends is the same as a time when transmission of a maximum interval transmission data frame ends,
   wherein the maximum interval transmission data frame is a frame in which effective downlink data is transmitted by the AP during the longest interval, and
   wherein residual data frames other than the maximum interval transmission data frame among the plurality of data frames are null-padded.

4. The method of claim 3, wherein the null padding includes a repeated MPDU delimiter field in which a MAC protocol data unit (MPDU) length field is configured as 0.

5. The method of claim 2,
   wherein each of the plurality of data frames includes at least one long training field (LTF) used for channel prediction,
   wherein the number of LTFs included in each of the plurality of data frames is determined based on the largest number of spatial streams, and
   wherein the spatial stream is used to transmit at least two data streams among the plurality of data frames to a specific STA based on multiple input multiple output (MIMO).

6. An access point (AP) transmitting a downlink for a plurality of stations (STAs) in a wireless local area network (WLAN), the AP comprising:
   a radio frequency (RF) unit configured to transmit and receive a radio signal;
   a processor configured to:
     transmit a multi-user request to send (MU RTS) frame to a first station (STA) and a second STA to simultaneously solicit uplink multi-user transmissions,
     wherein the MU RTS frame includes:
       first association identifier (AID) information for the first STA,
       second AID information for the second STA,
       first resource allocation information for a first uplink channel allocated to the first STA identified by the first AID information, and
       second resource allocation information for a second uplink channel allocated to the second STA identified by the second AID information; and
     simultaneously receive a first clear to send (CTS) frame and a second CTS frame from the first STA and the second STA in response to the MU RTS frame,
     wherein the first CTS frame is received via the first uplink channel based on the first resource allocation information, and
     wherein the second CTS frame is received via the second uplink channel based on the second resource allocation information.

7. The AP of claim 6,
   wherein the processor is configured to transmit a plurality of data frames to the first STA and the second STA after receiving the first and second CTS frames, and wherein each of the plurality of data frames is transmitted to each of the first STA and the second STA.

8. The AP of claim 7,
wherein a time when the transmission of the plurality of data frames ends is the same as a time when transmission of a maximum interval transmission data frame ends,
wherein the maximum interval transmission data frame is a frame in which effective downlink data is transmitted by the AP during the longest interval, and
wherein residual data frames other than the maximum interval transmission data frame among the plurality of data frames are null-padded.

9. The AP of claim 8, wherein the null padding includes a repeated MPDU delimiter field in which a MAC protocol data unit (MPDU) length field is configured as 0.

10. The AP of claim 7,
wherein each of the plurality of data frames includes at least one long training field (LTF) used for channel prediction,
wherein the number of LTFs included in each of the plurality of data frames is determined based on the largest number of spatial streams, and
wherein the spatial stream is used to transmit at least two data streams among the plurality of data frames to a specific STA based on multiple input multiple output (MIMO).

* * * * *